(12) United States Patent
Nazarian et al.

(10) Patent No.: US 12,485,340 B2
(45) Date of Patent: *Dec. 2, 2025

(54) VARIABLE PROPERTY SPORTING EQUIPMENT

(71) Applicant: Verispellis Skis & Snowboards, Inc., Wellesley, MA (US)

(72) Inventors: Ara Nazarian, Wellesley, MA (US); Edward K. Rodriguez, Medfield, MA (US)

(73) Assignee: VERISPELLIS SKIS & SNOWBOARDS, INC., Wellesley, MA (US)

(*) Notice: Subject to any disclaimer, the term of this patent is extended or adjusted under 35 U.S.C. 154(b) by 341 days.

This patent is subject to a terminal disclaimer.

(21) Appl. No.: 17/705,108

(22) Filed: Mar. 25, 2022

(65) Prior Publication Data
US 2023/0302345 A1  Sep. 28, 2023

(51) Int. Cl.
A63C 5/07 (2006.01)
A63C 5/12 (2006.01)
C22F 1/00 (2006.01)
C22F 1/10 (2006.01)

(52) U.S. Cl.
CPC .......... *A63C 5/07* (2013.01); *C22F 1/006* (2013.01); *C22F 1/10* (2013.01); *A63C 5/12* (2013.01); *A63C 2203/12* (2013.01); *A63C 2203/24* (2013.01)

(58) Field of Classification Search
CPC ......... A63C 5/07; A63C 5/12; A63C 2203/12; A63C 2203/24; A63C 5/06; A63C 5/00; C22F 1/006; C22F 1/10
See application file for complete search history.

(56) References Cited

U.S. PATENT DOCUMENTS

| | | |
|---|---|---|
| 4,864,860 A | 9/1989 | Manseth |
| 10,119,526 B1 | 11/2018 | Peeters et al. |
| 10,493,354 B2 | 12/2019 | Nazarian et al. |
| 10,603,571 B2 | 3/2020 | Nazarian et al. |
| 11,078,562 B2 * | 8/2021 | Nazarian .............. A01K 87/007 |
| 12,129,537 B2 | 10/2024 | Nazarian et al. |
| 2003/0155740 A1 | 8/2003 | Lammer |

(Continued)

FOREIGN PATENT DOCUMENTS

JP  H0837998  2/1996

OTHER PUBLICATIONS

"U.S. Appl. No. 15/409,745, Preliminary Amendment filed Sep. 11, 2017", 6 pgs.

(Continued)

*Primary Examiner* — James A Shriver, II
*Assistant Examiner* — Nicholas R. Kandas
(74) *Attorney, Agent, or Firm* — SCHWEGMAN LUNDBERG & WOESSNER, P.A.

(57) ABSTRACT

A system for adjusting physical properties of a ski or snowboard, through use of one or more specially shaped components applied upon or embedded within the ski or snowboard, wherein the components may be comprised of a thermally responsive material that includes nitinol, and wherein the nitinol components may themselves be treated using a specific method in order to achieve desired transformation results that adjust stiffness, rocker, and in some cases camber angle of a ski.

13 Claims, 9 Drawing Sheets

(56) References Cited

U.S. PATENT DOCUMENTS

| | | |
|---|---|---|
| 2007/0058070 A1 | 3/2007 | Chen |
| 2009/0218321 A1 | 9/2009 | Ashman |
| 2012/0099004 A1 | 4/2012 | Shibuno |
| 2012/0276309 A1* | 11/2012 | Failing .................... A63C 5/03 428/34.1 |
| 2013/0309089 A1 | 11/2013 | Madsen et al. |
| 2013/0341127 A1 | 12/2013 | Mann |
| 2014/0138367 A1 | 5/2014 | Zhang et al. |
| 2016/0147262 A1 | 5/2016 | Lee |
| 2017/0203192 A1 | 7/2017 | Nazarian et al. |
| 2018/0147476 A1 | 5/2018 | Nazarian et al. |
| 2020/0063251 A1* | 2/2020 | Nazarian ............... F03G 7/0615 |
| 2022/0002852 A1 | 1/2022 | Nazarian et al. |

OTHER PUBLICATIONS

"U.S. Appl. No. 15/409,745, Non Final Office Action mailed Oct. 5, 2018", 14 pgs.

"U.S. Appl. No. 15/409,745, Response filed Dec. 26, 2018 to Non Final Office Action mailed Oct. 5, 2018", 12 pgs.

"U.S. Appl. No. 15/804,938, Non Final Office Action mailed Jan. 11, 2019", 13 pgs.

"U.S. Appl. No. 15/409,745, Examiner Interview Summary mailed Apr. 11, 2019", 4 pgs.

"U.S. Appl. No. 15/409,745, Final Office Action mailed Apr. 18, 2019", 13 pgs.

"U.S. Appl. No. 15/804,938, Response filed May 13, 2019 to Non Final Office Action mailed Jan. 11, 2019", 12 pgs.

"U.S. Appl. No. 15/409,745, Response filed Jun. 18, 2019 to Final Office Action mailed Apr. 18, 2019", 12 pgs.

"U.S. Appl. No. 15/409,745, Advisory Action mailed Jul. 1, 2019", 5 pgs.

"U.S. Appl. No. 15/409,745, Response filed Jul. 18, 2019 to Advisory Action mailed Jul. 1, 2019", 12 pgs.

"U.S. Appl. No. 15/409,745, Notice of Allowance mailed Jul. 29, 2019", 8 pgs.

"U.S. Appl. No. 15/804,938, Final Office Action mailed Aug. 22, 2019", 16 pgs.

"U.S. Appl. No. 15/804,938, Response filed Oct. 21, 2019 to Final Office Action mailed Aug. 22, 2019", 13 pgs.

"U.S. Appl. No. 15/804,938, Notice of Allowance mailed Nov. 21, 2019", 8 pgs.

"U.S. Appl. No. 16/666,909, Non Final Office Action mailed Aug. 7, 2020", 19 pgs.

"U.S. Appl. No. 16/666,909, Response filed Nov. 9, 2020 to Non Final Office Action mailed Aug. 7, 2020", 9 pgs.

"U.S. Appl. No. 16/666,909, Final Office Action mailed Feb. 25, 2021", 18 pgs.

"U.S. Appl. No. 16/666,909, Response filed Mar. 24, 2021 to Final Office Action mailed Feb. 25, 2021", 7 pgs.

"U.S. Appl. No. 16/666,909, Notice of Allowance mailed Apr. 5, 2021", 10 pgs.

"U.S. Appl. No. 17/374,150, Preliminary Amendment filed Sep. 27, 2021", 6 pages.

"U.S. Appl. No. 17/374,150, Non Final Office Action mailed Jan. 14, 2022", 20 pgs.

"U.S. Appl. No. 17/374,150, Response filed Jun. 14, 2022 to Non Final Office Action mailed Jan. 14, 2022", 10 pgs.

"U.S. Appl. No. 17/374,150, Non Final Office Action mailed Sep. 29, 2022", 20 pgs.

"U.S. Appl. No. 17/374,150, Response filed Feb. 28, 2023 to Non Final Office Action mailed Sep. 29, 2022", 9 pgs.

"U.S. Appl. No. 17/374,150, Final Office Action mailed Apr. 18, 2023", 17 pgs.

"U.S. Appl. No. 17/374,150, Response filed Oct. 17, 2023 to Final Office Action mailed Apr. 18, 2023", 8 pgs.

"U.S. Appl. No. 17/374,150, Non Final Office Action mailed Dec. 8, 2023", 15 pgs.

"U.S. Appl. No. 17/374,150, Response filed Jun. 10, 2024 to Non Final Office Action mailed Dec. 8, 2023", 9 pgs.

"U.S. Appl. No. 17/374,150, Notice of Allowance mailed Jun. 26, 2024", 10 pgs.

* cited by examiner

VARIABLE PROPERTY SPORTING EQUIPMENT

TECHNICAL FIELD

The present application relates generally to systems and methods for providing sporting equipment with dynamic physical properties, and more specifically but not limited to specially configured skis and snowboards.

BACKGROUND

The present invention relates to performance-based geometric and physical parameters of skis and snowboards, and more particularly to the flexibility, stiffness, and geometric parameters in a ski or snowboard, wherein the flexibility and stiffness may correspond with torsional stiffness, as well as axial stiffness, and wherein a geometric parameter may include a rocker angle.

Sporting equipment, such as a ski or snowboard, are typically purchased based on the specific skill levels and needs of the user. For example, existing skis and snowboards are designed for specific skiing conditions (groomer, powder, off-piste, and the like) that provide better control for each skiing/snowboarding environment. This is accomplished by changes in the physical shape of the skis, the manufacturing materials and binding/boot configurations among other factors.

The term "ski/snowboard geometry" typically refers to a physical property, or shape, of a ski or snowboard. Described in the direction of travel, the front of the ski or snowboard, typically pointed or rounded, is the tip, the middle is the waist and the rear is the tail. Skis and snowboards may have four aspects that define their basic performance: length, width, sidecut and camber. Skis and snowboards may also differ in more minor ways to address certain niche roles. For instance, skis or snowboards for moguls are much softer to absorb shocks from the quick and sharp turns of the moguls and skis or snowboards for powder are much wider to provide more "float" in deeper, softer snow.

Camber describes the shape of a traditional ski or snowboard. For example, when placed on a flat surface a ski or snowboard will rest on points near its tip and tail while its waist arcs upward. This built-in arch is the camber of the ski or snowboard.

Camber puts "springiness" and "pop" into a ski, thereby providing easy handling, responsive turning, powerful carving, stability and, due to ample edge contact with the snow, good grip on icy slopes. Alternate terms for camber include standard alpine and positive camber.

On the other hand, rocker is essentially the opposite of camber, thus is also known as reverse camber or negative camber. The side profile of a rockered ski or snowboard resembles the upturned rails of a rocking chair. On a flat surface, the midsection of a rockered ski or snowboard will rest on the ground while its tips and tails rise off the ground much earlier than they do on a cambered ski.

Rocker may offer a number of advantages in certain conditions. For example, a ski or snowboard with increased rocker angle may have improved flotation in powder, greater maneuverability, and may in some instances enhance the riding experience in a park setting.

Once manufactured, except for minor adjustments, such as waxing or binding adjustments, the performance characteristics of existing skis or snowboard are fixed. As a result, none of the existing categories allow a skier/snowboarder to modify the stiffness of the ski/snowboard to adapt to changing snow conditions during the day. According to present systems and methods, multiple different pieces of sporting equipment are needed based on a multitude of factors that include an athlete's strength, skill level, or conditions of use.

BRIEF DESCRIPTION OF THE DRAWINGS

Some embodiments are illustrated by way of example and not limitation in the figures of the accompanying drawings in which.

DETAILED DESCRIPTION

Example methods and systems for adjusting physical properties of sporting equipment such as a ski or snowboard are described herein. In the following description, for purposes of explanation, numerous specific details are set forth in order to provide a thorough understanding of example embodiments. It will be evident, however, to one skilled in the art that the present invention may be practiced without these specific details. The description is not to be taken in a limiting sense but is made merely for the purpose of illustrating the general principles of the invention, since the scope of the invention is best defined by the appended claims.

While embodiments described herein may be applied to many items of sporting equipment, including a ski, a snowboard, a water-ski, a wakeboard, a skim board, a skateboard, and the like, for purposes of brevity in discussion, the specification will simply discuss the disclosed invention in the context of a ski. Accordingly, embodiments of the present invention provide a system, method, and apparatus for dynamic and real-time adjustments to physical properties of a ski, wherein those physical properties may include torsional stiffness, axial stiffness, as well as a rocker or camber of a ski or snowboard.

According to certain embodiments discussed herein, one or more specially shaped components may be applied upon or embedded within a ski, wherein the components may be comprised of a thermally responsive material that includes nitinol, and wherein the nitinol components may themselves be treated using a specific method in order to achieve desired transformation results that adjust stiffness, rocker, and in some cases camber angle of a ski.

In some embodiments, the components may be shaped and positioned within a ski in such a way as to maximize changes in one or more physical properties based on a desired phase change, and wherein the desired phase change may be achieved by activating a heating element proximate to the components in order to apply a requisite amount of heat to the components. Accordingly, various physical properties of a ski may by adjusted in real-time, wherein those physical properties may include: torsional stiffness; axial stiffness; rocker angle; and camber.

In some embodiments, a mechanical pulling mechanism may be affixed or embedded within a first end and second end of a ski, such that activation of the mechanical pulling mechanism may cause a tip or tail of the ski to increase or decrease in rocker angle. For example, the mechanical pulling mechanism may comprise: a pulling device, such as an electronic winch, lever, or screw jack; a wire or line; a dampening mechanism, such as a spring or hydraulic cylinder; and a guiding mechanism, such as a hollow tube, or series of U-clamps.

By way of example, the system provides an athlete the ability to have a single set of skis with dynamically adjustable properties that may be adjusted automatically based on detected conditions, or controlled by the based on inputs directly to the item of sporting equipment, or via a client device communicatively coupled with the sporting equipment. For example, with a set of skis, snowboard, or boots, a skier/snowboarder may adjust the stiffness of his or her skis, snowboard, and/or boots based on the skiing or snowboarding conditions, throughout the day, without the need to change their skis/snowboard. This will enable the skier or the snowboarder to have better control and potentially reduce risk of injury.

Figure 1:
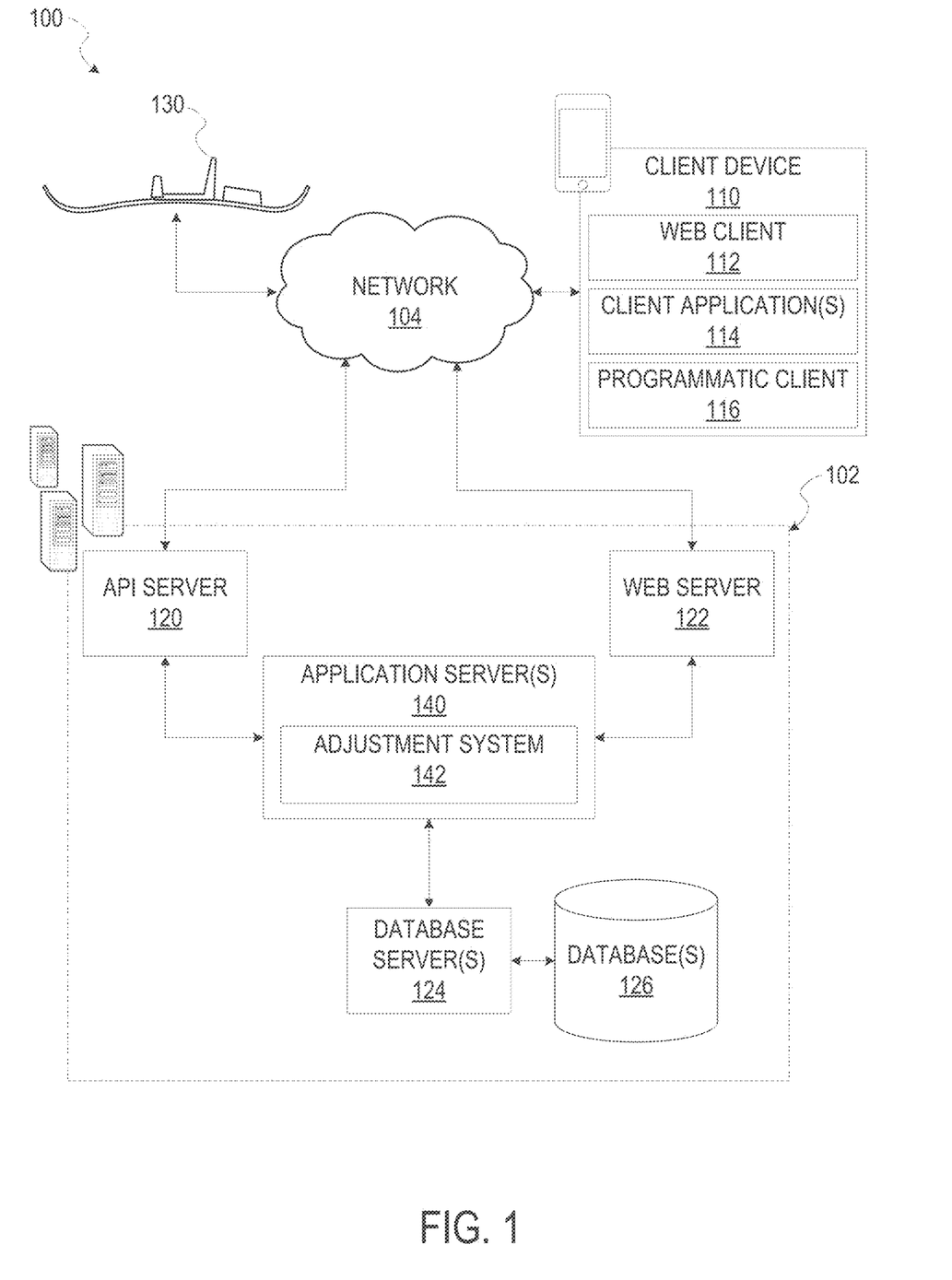
FIG. 1 is a network diagram illustrating a network environment suitable for providing a system to adjust physical properties of sporting equipment, such as a ski or snowboard, according to some example embodiments.

FIG. 1 is a network diagram illustrating a network environment 100 suitable for operating features of the system for adjusting physical properties of an item of sporting equipment (e.g., adjustment system 142), according to some example embodiments. A networked system 102, in the example form of a network-based publication system, provides server-side functionality, via a network 104 (e.g., one or more of the Internet, a Wide Area Network (WAN), Bluetooth), to one or more clients. For example, in some embodiments, the client device 110 may be communicatively coupled with the sporting equipment 130 based on a wireless connection, such as Bluetooth, while the sporting equipment 130, and client device 110 may be in communication with the networked system 102 via the Internet or a WAN. FIG. 1 illustrates, for example, a web client 112 (e.g., a web browser), client applications 114, and a programmatic client 116 executing on respective client device 110.

An Application Program Interface (API) server 120 and a web server 122 are coupled to, and provide programmatic and web interfaces respectively to, one or more application servers 140. In some example embodiments, the application servers 140 host the adjustment system 142. The application servers 118 are, in turn, shown to be coupled to one or more database servers 124 that facilitate access to one or more databases 126. In some embodiments, the one or more databases 126 may host The adjustment system 142 performs operations that include: determining a condition; selected a phase change from within the databases 126 based on the determined condition; identifying one or more components within the sporting equipment 130 based on the phase change; and causing a heating element to impart the desired phase change to the sporting equipment 130. For example, in some embodiments, the adjustment system 142 may determine a condition based on sensor data that includes location data, temperature data, and ski condition data received from the client device 110. Responsive to determining the condition, the adjustment system 142 may access the databases 126 to determine a phase change that corresponds with the determined condition. For example, a condition may include a ski condition, such as "powder," or "icy," and wherein each condition may correspond with an optimum physical property that may be achieved based on a phase change. Upon determining the condition, the adjustment system 142 determines an optimum physical property, and a phase change that corresponds with the optimum physical property. The adjustment system 142 may then cause a change to the physical properties of the sporting equipment 130 by either transmitting instructions to perform the phase change directly to the sporting equipment 130, or to the client device 110, wherein the client device 110 may be communicatively coupled with the sporting equipment 130.

In some embodiments, a user of the client device 110 may provide inputs into a graphical user interface (GUI) presented at the client device 110 in order to select or otherwise identify a condition. Upon receiving a selection of the condition, the client device 110 may transmit instructions to the sporting equipment 130 to perform the phase change to the sporting equipment 130.

While the adjustment system 142 is shown in FIG. 1 to form part of the networked system 102, it will be appreciated that, in alternative embodiments, the adjustment system 142 may be distributed between the client device 110 and the sporting equipment 130.

Figure 2:
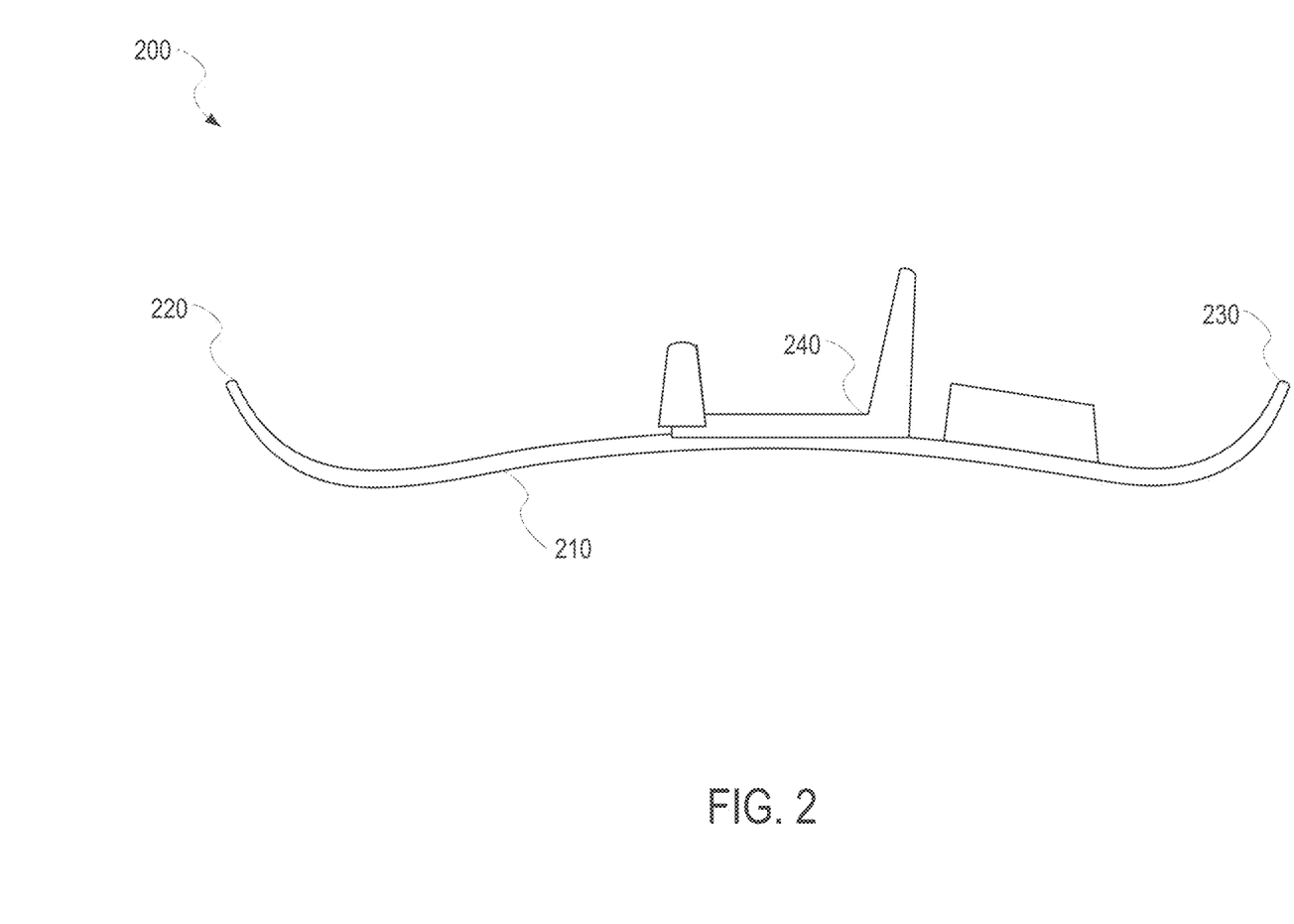
FIG. 2 is a diagram depicting various components of an adjustable ski, according to certain example embodiments.
Figure 3:
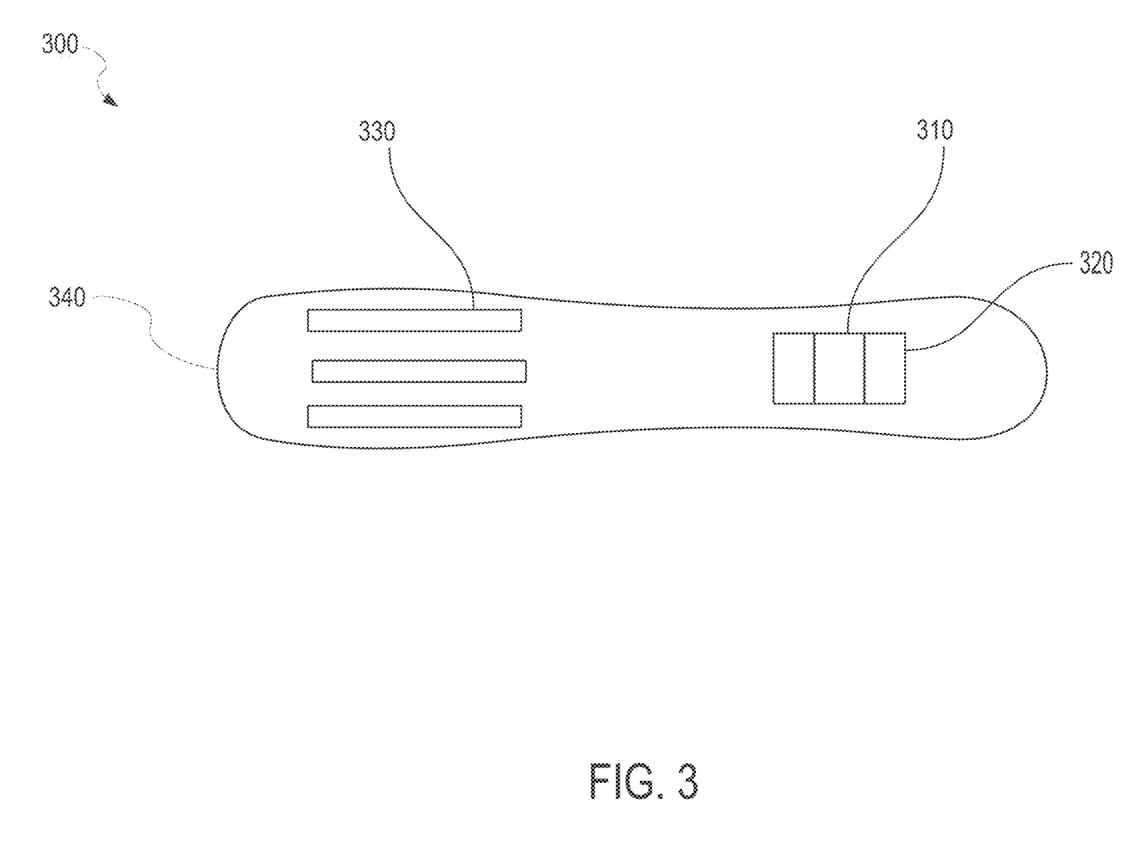
FIG. 3 is a diagram depicting various components of an adjustable ski, according to certain example embodiments.

For purposes of non-limiting illustration, the drawings of FIG. 2 and FIG. 3 generally depict the body of sporting equipment, that may include a ski or snowboard. For ease of description, an embodiment of a ski will be described, it being understood that the technology disclosed herein finds applicability to a pair of skis, a snowboard, boots, and bindings, and other articles of athletic equipment.

As will be appreciated from the side elevational view of FIG. 2, a ski 200 comprises an elongate body 210, having a front end 220 and a back end 230. The ends 220 and 230 may be formed with an upturned tip or tail, respectively. The elongate body 210 has a substantially flat surface along its longitudinal length, with a slightly arched upward curvature intermediate the ends. A binding 240 may be mounted proximate to a midpoint of the ski 200. The binding 240 serves to releasably attach a boot to the ski 200.

Referring now to the top surface view shown in diagram 300 of FIG. 3, a battery pack 310 and control unit 320 may be mounted to an aft portion of the ski 340, or be attached to the back of the boots, to provide a power source and control unit for operation of the system components and circuitry that may include a heating control module and a connectivity module. The control unit 320 may comprise a connectivity module and a nitinol heating control module, wherein the ski body (i.e., the ski body 210 of FIG. 2) may comprise a heating element means embedded within or on a surface of the ski body 210. The ski 340 may also be provided with a plurality of thermally responsive components 330, wherein the thermally responsive components may be applied to a surface of the ski 340 or embedded within a layer of the ski 340. In some embodiments, as discussed herein, the thermally responsive components may comprise attributes including a shape, wherein the shape may be designed and positioned upon the ski 340 to maximize a desired change in physical property (i.e., rocker angle, torsional stiffness).

The control unit 320 may include a battery-charging module that receives and regulates the electric charges to recharge the battery back and extend the battery life of the system. The battery pack 310 may be any suitable battery source and is preferably a lithium-ion battery.

In some embodiments, the thermally responsive components 330 are formed using a shape memory alloy, such as an alloy of nickel and titanium (or, "nitinol"), and may be applied to a surface of the ski 340 or embedded within the ski 340. According to certain example embodiments, the components may be formed of nitinol which has been treated using a treatment process that comprises one or more treatment temperatures and treatment durations, wherein the treatment process imparts corresponding properties to the treated component. For example, in some embodiments, the nitinol components may be treated at a treatment temperature of 805° Celsius (C), and a treatment duration of 5 minutes. In further embodiments, the nitinol components may be treated at a treatment temperature of 550° C., and a treatment duration of 5 minutes. In further embodiments, the nitinol components may be treated at a treatment temperature of 400° C. and a treatment time of 5 minutes. In further embodiments, the nitinol components may be treated at a treatment temperature of 805° C., and a treatment duration of 30 minutes.

In some embodiments, the treatment processes described above may also include one or more quench cycles, wherein the nitinol components are rapidly cooled in water, oil, or air. In some embodiments, the treatment process may comprise a combination of multiple treatment process cycles. For example, as an illustrative example, the treatment process for a particular nitinol component may comprise an initial treatment temperature of 805° C. for a treatment duration of 30 minutes, followed by a first quench, followed by a subsequent treatment temperature of 550° C. at a treatment duration of 5 minutes and a second quench.

In some embodiments, the specific treatment process may be determined based on the application of the nitinol component, wherein the application includes a location of the nitinol component within the item of sporting equipment.

In some example embodiments, the control unit 320 may cause one or more of the components to induce a phase shift, or to activate the mechanical pulling mechanism, thus enabling the control unit 320 to control a flexibility property of an item of sporting equipment (e.g., ski 340) with a greater level of precision and resolution. In further embodiments, the control unit 320 may further be configured to cause a portion of the components at specific locations along the item of sporting equipment to induce phase shifts of varying degrees. For example, the control unit 320 may cause a first portion of the thermally responsive components 330 components to induce a phase shift of a first degree, and a second portion of the thermally responsive components 330 to induce a phase shift of a second degree.

In further embodiments, a property of an input may define a phase change to be applied to one or more of the components. As an illustrative example, the control unit 320 may be coupled with an input module, such as a switch mechanism or other sensor device (i.e., a trigger, a push-button, multi-position switch, optical sensor, etc.), through which a user may provide an input. A duration of the input, for example a period of time in which the switch mechanism is closed, may thereby correlate with varying phase changes. For example, a first input duration may cause the system to induce a phase change upon a first portion of the components, while a second input duration may cause the system to induce a phase change upon a second portion of the components, wherein the second portion of the components may include the first portion. In some embodiments, the input duration may correlate with a temperature of the heating element.

In some embodiments, the control unit 320 may be coupled with a digital or mechanical multi-position switch, such as a rotary switch, wherein an input property of inputs received at the multi-position switch may include a switch position registered by the multi-position switch.

Figure 4:
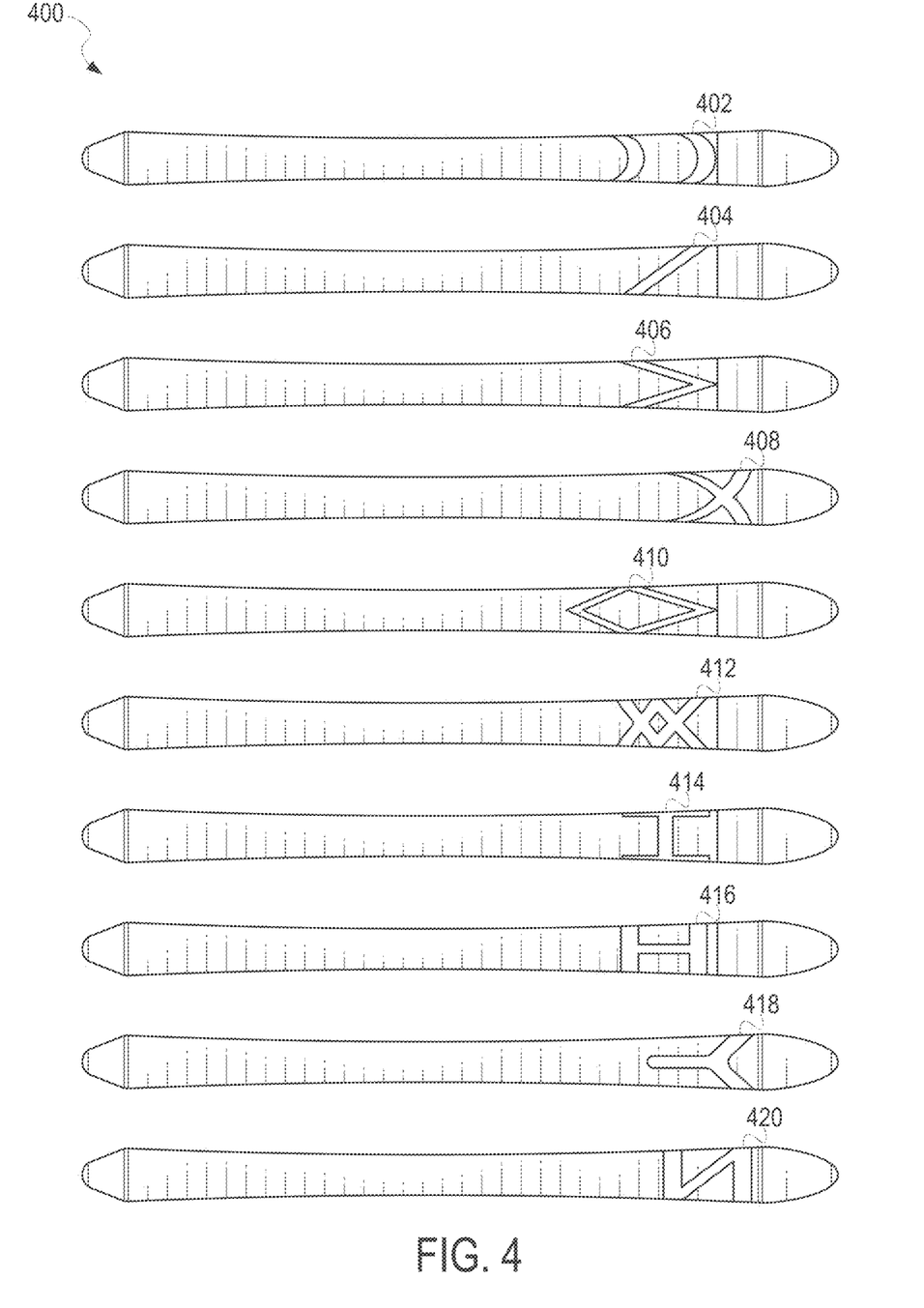
FIG. 4 is a diagram depicting various embodiments of a shaped inlay component configured to adjust a physical property of a ski or snowboard, according to certain example embodiments.

FIG. 4 is a diagram 400 depicting various possible configurations of thermally responsive components as discussed herein. While the diagram 400 provides that the thermally responsive components are located at the tip of a ski, there are likewise embodiments wherein the thermally responsive components may be applied to one or both of the tip and the tail, as well as within the waist of the ski. Similarly, while the diagram 400 depicts various configurations and shapes of the thermally responsive components individually, it is likewise conceived that one or more of the embodiments depicted in the diagram 400 may be applied at the same time, such that a plurality of the thermally responsive components may be applied in a single pair of skis, either in layers, overlapping in a single layer, or adjacent to one another.

As seen in the diagram 400, various inlay component shapes are depicted by the components 402, 404, 406, 408, 410, 412, 414, 416, 418, and 420. Typically, skis are constructed by layers of wood, composite material, steel edges, as well as occasionally carbon fiber or fiberglass which are laminated together. In some embodiments, the shaped inlay components depicted in the diagram 400 may be applied directly to a top or bottom surface of a ski or snowboard and covered by a top-sheet or base. In some embodiments, the shaped inlay components may be embedded within the ski construction, such as on top or below a wood core of the ski, then laminated. In some embodiments, multiple layers of shaped inlay components may be applied, such that each layer may comprise a distinct shape of shaped inlay component intended to achieve a desired change in physical properties.

As an illustrative example, a single pair of skis may include the shaped inlay component 402 applied upon a top surface of a ski, while the shaped inlay component 408 is embedded as a layer within the ski construction, and the inlay component 416 is applied upon the bottom surface of the ski. Accordingly, each shaped inlay component may be configured and positioned in order to maximize a specific change in physical properties of the ski. For example, the shaped inlay component 402 may cause a rocker angle of the ski to increase based on a corresponding phase change, whereas the shaped inlay component 408 may cause an increase in torsional stiffness based on a corresponding phase change.

Figure 5:
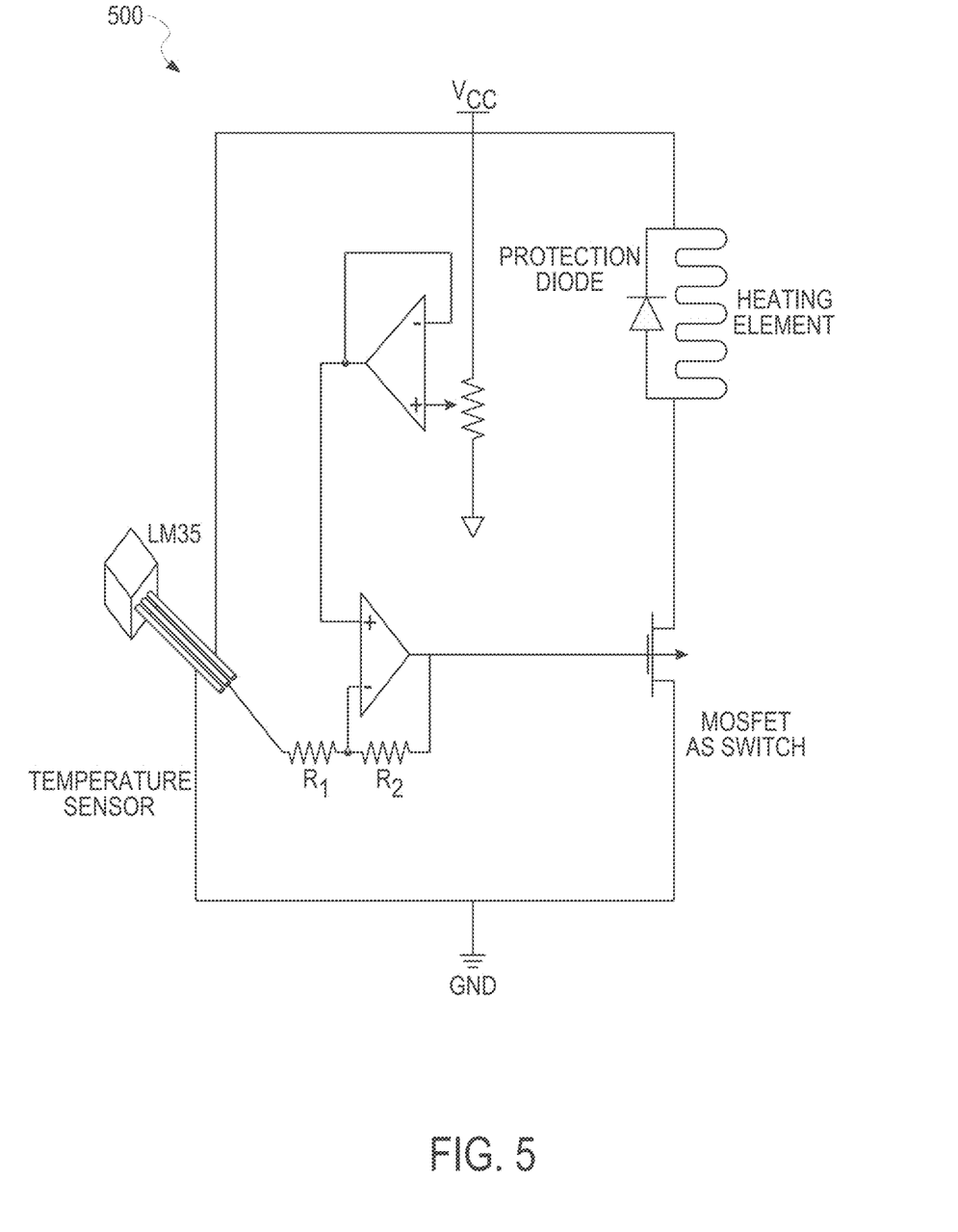
FIG. 5 is an electric circuit schematic of a control unit of a heating system, according to certain example embodiments.

FIG. 5 is an electric circuit schematic 500 of the control unit 320, according to certain example embodiments. The description is not to be taken in a limiting sense, as it describes one of the methods to control the system. The first stage of the circuit is a temperature sensor (LM35) used to constantly monitor the temperature of the item of sporting equipment (e.g., ski body 210 of FIG. 2). The output of the sensor is electric voltage linearly dependent on the ski board temperature. The second stage of the circuit is for comparison of the measured voltage (measured temperature) from the sensor with the adjustable reference voltage. The reference voltage may be precisely adjusted to desired level using the resistor Vr. The difference between the measured voltage and the reference voltage will set the voltage at the gate of MOSFET to high which results in current flow through the heating element and eventually heating up the ski board. At the same time the temperature sensor will monitor the temperature increase in the board and increasing the sensor output voltage accordingly. The MOSFET will stay on as long as there is voltage difference and once the voltage level from the sensor reaches the reference voltage, the MOSFET will be turned off which stops current flow through the element. The power supply for the circuit is 12v, which can heat up the board for 2-3 hours. In some embodiments, the heating element means comprises a Nichrome wire, which has well defined resistance and thermal property.

The heating element means functions to increase the temperature of the item of sporting equipment, and according to certain example embodiments, may comprise a Nichrome wire or another option. Nichrome wire heating elements have well defined resistance and derived current at different temperatures based on the measurement done in different conditions.

In some embodiment, a temperature gradient of approximately 10° C. may be desired. In some embodiments, the wire may include 24 inch Nichrome wires with Gauge size of 26, in order to increase the temperature from 32° F. to 42° F., we have to derive 0.36A current with 12v source.

Accordingly, physical parameter controls for each individual components is modulated and regulated by selectively activating a heating element, such as coil or mesh that is built into the ski. The heating element may comprise a plurality of elements that are each positioned adjacent to the thermally responsive components (e.g., Nitinol layer) to induce a phase change upon the components by applying varying amounts of heat to portions of the plurality of thermally responsive components. The heating elements are operatively connected to the heating control module of the control unit 320 so as to maintain the desired temperature corresponding to the desired selected stiffness of the ski, by region or zone. The heating control module circuitry may also include temperature sensors embedded in the item of sporting equipment to provide feedback to the heating control module for regulating the desired temperature of one or more of the components. The shape memory components will have a heating element adjacent to them that can provide a rapid temperature rise adjustment of the element and therefore increase the stiffness property of the item of sporting equipment.

Figure 6:
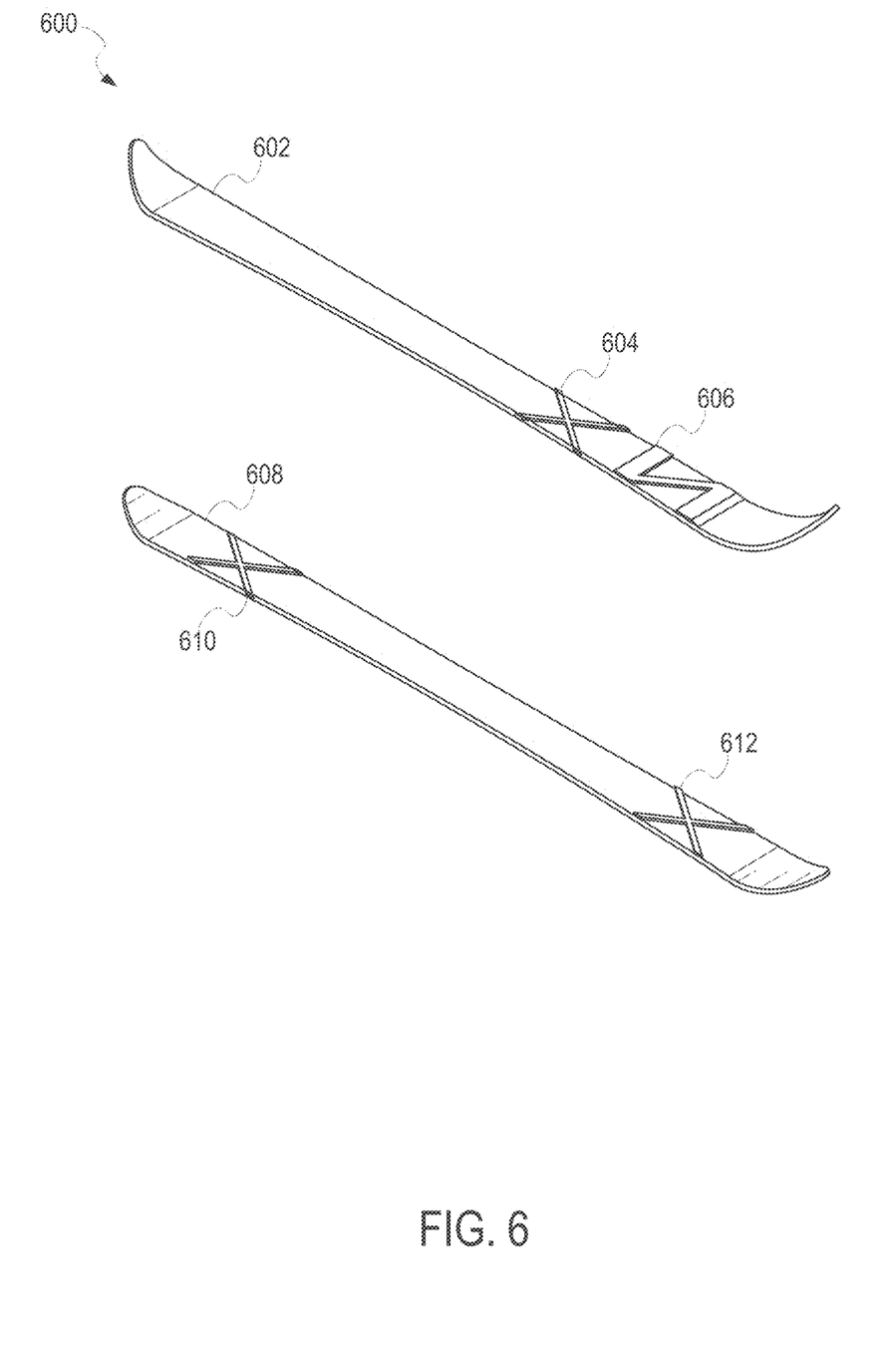
FIG. 6 is a diagram depicting skis that include shaped inlay components for adjusting physical properties, according to certain example embodiments.

FIG. 6 is a diagram 600 depicting skis 602 and 608 that include shaped inlay components 604, 606, 610, and 612 for adjusting physical properties, according to certain example embodiments.

As seen in the diagram 600, a plurality of inlay components may be applied to a ski, in various combinations and orientations. For example, the ski 602 may include inlay components 604 and 606 located proximate to a tip of the ski 602. In some embodiments, as depicted by the ski 608, the inlay components 610 and 612 may be located at opposing ends of the ski.

Figure 7:
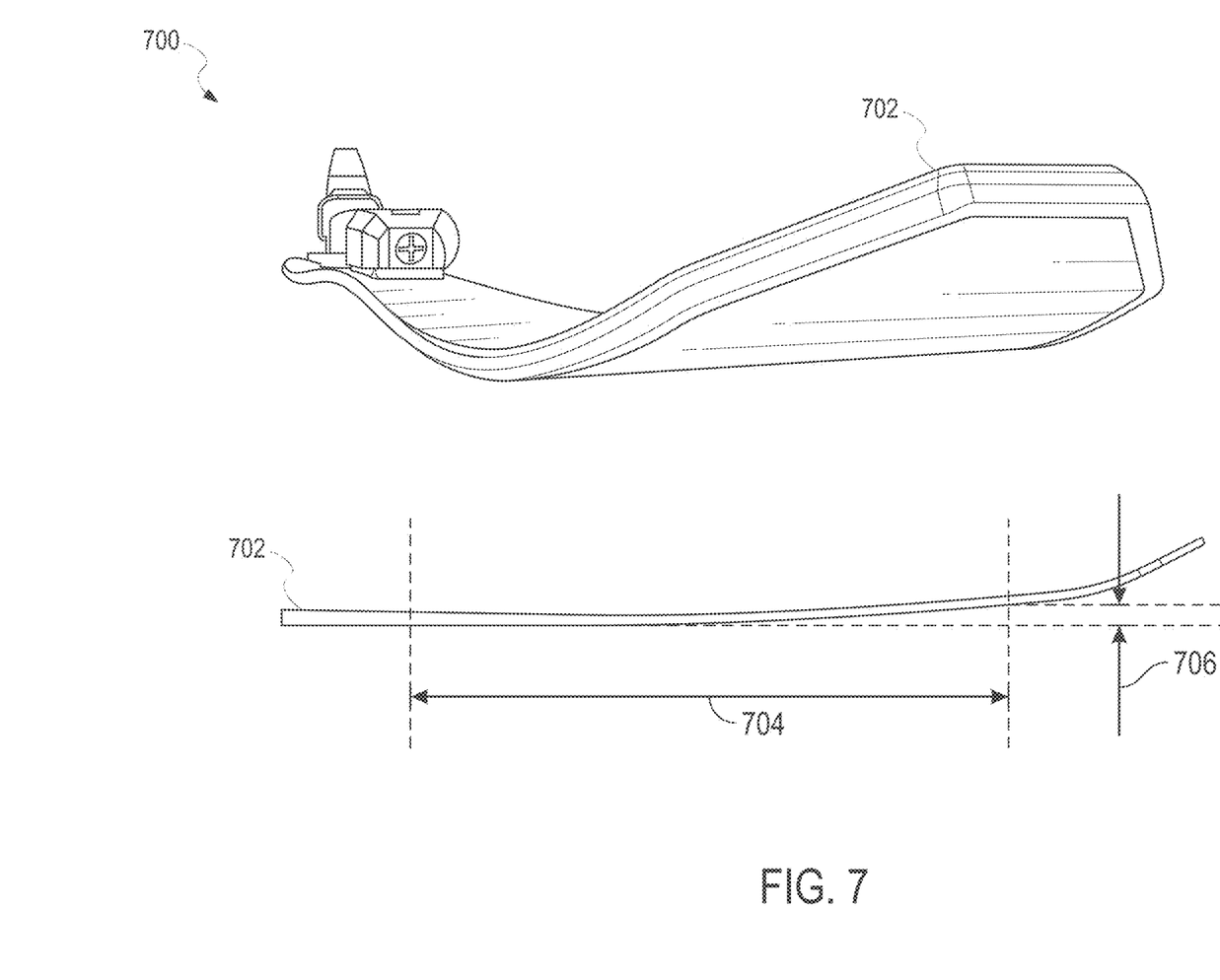
FIG. 7 is a diagram depicting an adjustment in rocker angle of a ski, according to certain example embodiments.

FIG. 7 is a diagram 700 depicting an adjustment in rocker angle of a ski 702, according to certain example embodiments. As seen in the diagram 700, a user of a ski 702 may adjust various physical properties of the ski 702, including a rocker length 704, and a rocker height 706.

The diagram 700 includes a depiction of a ski 702 presented above a profile of a front portion of the ski 702. Accordingly, the adjustment system 142 may determine a condition, and based on the determined condition, may cause a phase change at one or more inlay components applied to the ski 702 in order to adjust a rocker length 704 and a rocker height 706 of the ski 702.

In some embodiments, adjustments to rocker length 704 and rocker height 706 may be performed manually.

Figure 8:
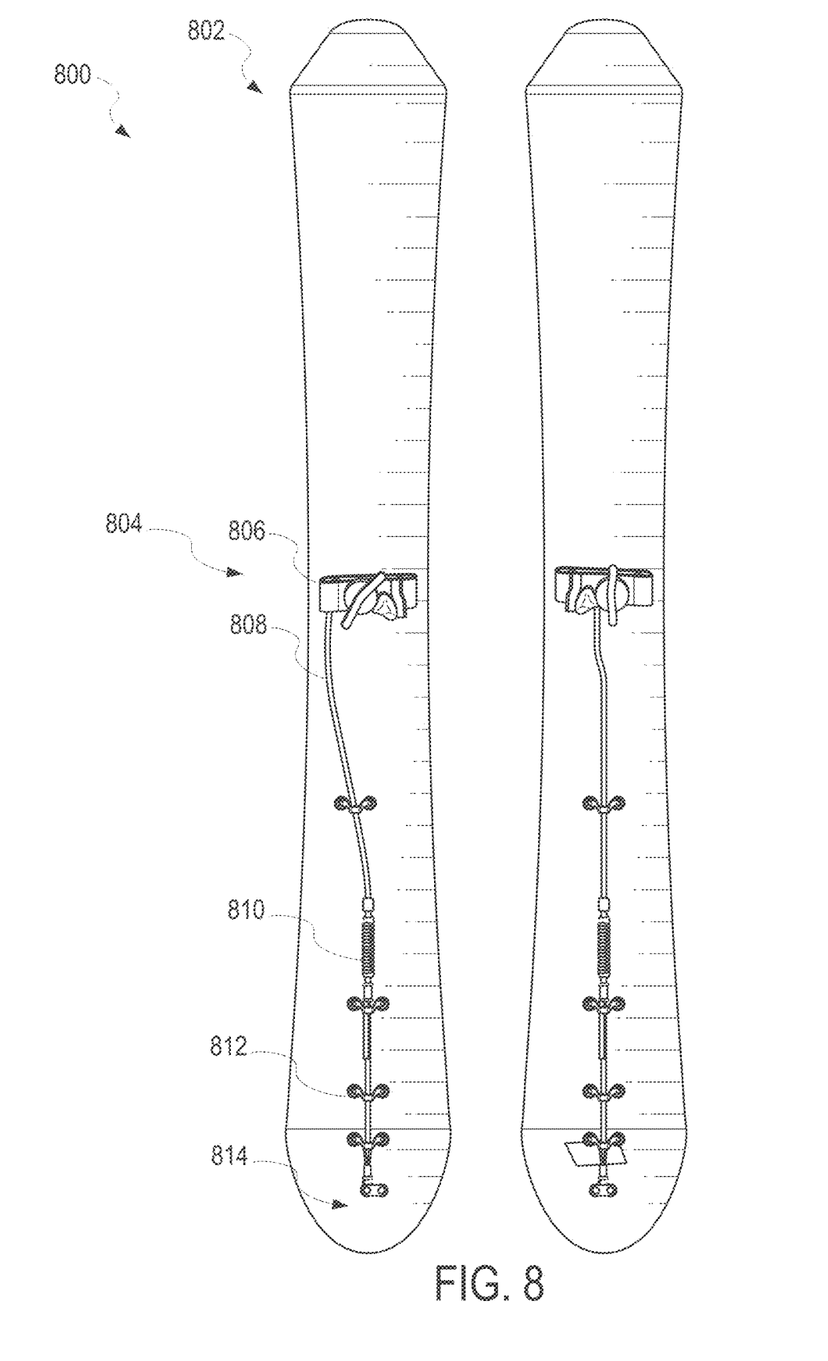
FIG. 8 is a diagram depicting a manually adjustable embodiment of an adjustable ski or snowboard, according to certain example embodiments.

FIG. 8 is a diagram 800 depicting a manually adjustable embodiment of an adjustable ski or snowboard, according to certain example embodiments. As seen in the diagram 800, the ski 802 may further comprise a mechanical pulling mechanism 804, wherein the mechanical pulling mechanism 804 comprises: a pulling device 806, wherein the pulling device 806 may comprise an electronic winch, lever, or screw jack; a cable 808 which may be retracted or released by the pulling device 806, and may comprise a braided cable; a dampening element 810, wherein the dampening element 810 may comprise a spring or hydraulic cylinder, and wherein the dampening element 810 may be affixed to one or more ends of the cable 808, or at a position between the ends of the cable 808; and a cable guide 812, wherein the cable guide 812 may comprise a series of U-clamps affixed to a surface of the ski 802, or in some embodiments may comprise a flexible hollow tube (round or semi-circle) embedded within the ski 802, or upon a surface of the ski 802.

Accordingly, by activating the adjustment system 142, the mechanical pulling mechanism 804 may cause the pulling device 806 to retract the cable 808, thereby causing the tip 814 of the ski 802 to increase in rocker angle. Further details related to activation of the mechanism is described in the method 900 depicted in FIG. 9.

In some embodiments, the mechanical pulling mechanism 804 may be activated manually. For example, in instances where the mechanical pulling mechanism 804 comprises an electronic winch, a user of the adjustment system 142 may provide an input to activate the electronic winch. For example, the input may be received via a GUI presented at the client device 110, or through a physical button or switch associated with the mechanical pulling mechanism 804.

In some embodiments, the mechanical pulling mechanism may be operated manually. For example, in instances where the mechanical pulling mechanism comprises a lever or screw jack, a user may simply pull the lever or rotate the screw jack until a desired rocker angle is achieved.

Figure 9:
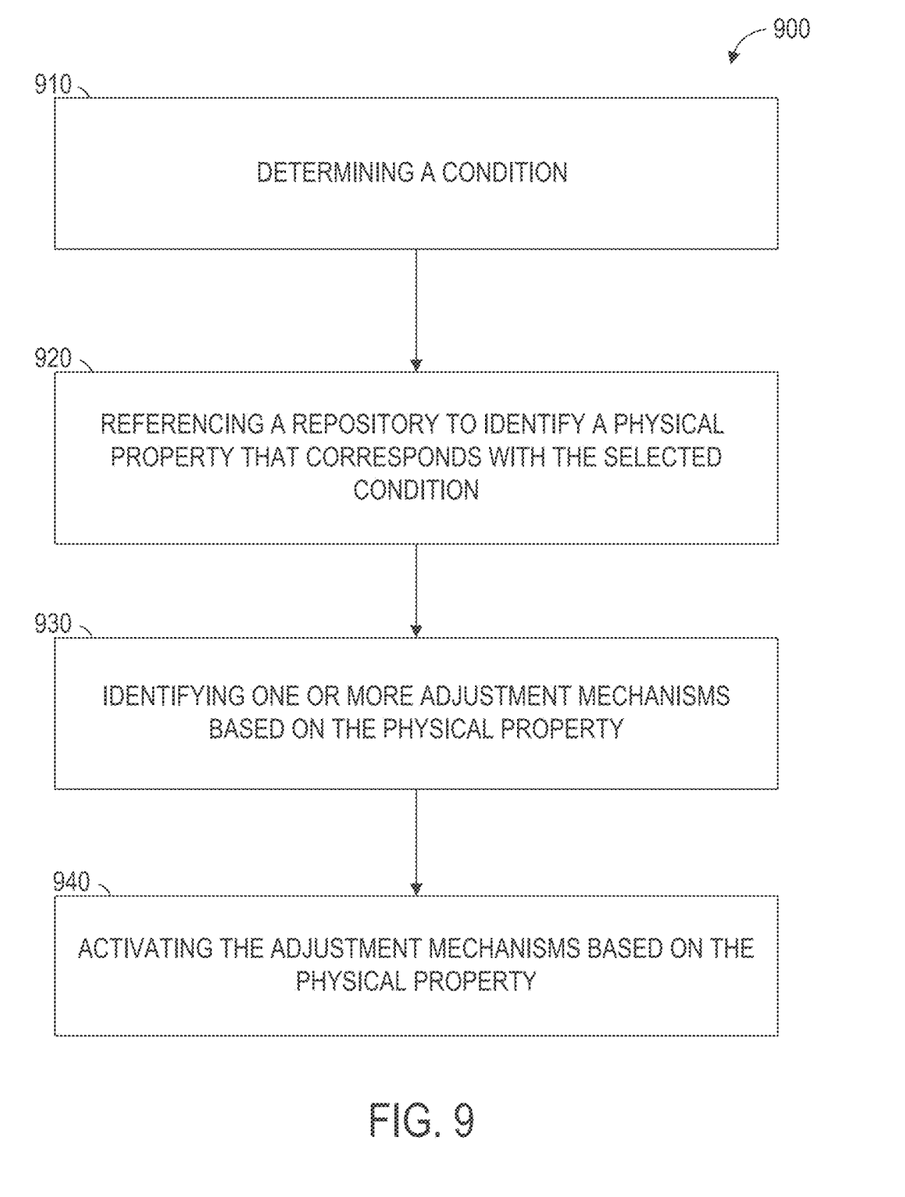
FIG. 9 is a flowchart illustrating a method for adjusting a physical property of a ski or snowboard, according to certain example embodiments.

FIG. 9 is a flowchart 900 describing a method for adjusting a physical property of a ski, according to certain example embodiments. Operations of the method 900 may be performed by the adjustment system 142. As shown in FIG. 9, the method 900 includes operations 910, 920, 930, 940, and 950.

At operation 910, the adjustment system 142 system determines a condition, such as a ski, location, or weather condition. In some embodiments, determination of the condition may be based on explicit inputs received from the client device 110. For example, a user of the client device 110 may provide inputs that select or otherwise define a condition from among a plurality of conditions. As an illustrative example, conditions may include one or more of: powder; park; groomer; ice.

In some embodiments, determination of the condition may be based on sensor data, such as location data, or weather data, which may be received by the adjustment system 142, while in further embodiments, the determination of the condition may be based on explicit inputs received from a user of the adjustment system 142 via a graphical user interface presented at a client device 110.

Responsive to determining the condition, at operation 920 the adjustment system 142 accesses a repository (i.e., the database 126) to identify a physical property that corresponds with the condition. For example, the database 126 may comprise a repository of correlations between various conditions and physical properties, wherein the correlations may be updated or recorded based on crowd sourced data. As an illustrative example, the adjustment system 142 may collect data from users of the adjustment system 142 to determine what physical properties are most often applied in any given condition. Such correlations may further be indexed based on skill level, such that a selected condition may be correlated with a physical property and skill level. As an illustrative example, an expert rider in a given condition (e.g., powder) may be correlated with a first physical property, whereas a beginner rider in the given condition may be correlated with a second physical property. Accordingly, the skill level of a rider may be recorded within a user profile associated with the client device 110, such that requests received by the adjustment system 142 from the client device 110 may likewise contain user profile data.

At operation 930, the adjustment system 142 identifies one or more adjustment mechanisms based on the desired physical property. For example, the adjustment mechanisms may include one or more thermally responsive components, and the mechanical pulling mechanism depicted in FIG. 8. For example, in an instance where the physical property relates to an increase in rocker angle, the adjustment system 142 may identify one or more thermally responsive components located at a tip of a ski, and the mechanical pulling mechanism in order to achieve the necessary rocker angle that corresponds with the desired physical property.

At operation 940, the adjustment system 142 activates the one or more adjustment mechanisms. For example, the adjustment system 142 may activate a heating element proximate to the one or more thermally responsive components to impart a phase change based on the physical property, and may activate an electronic winch associated with the mechanical pulling mechanism to retract a cable to achieve the desired physical property.

What is claimed is:

1. A system comprising:
   an item body, the item body comprising a first end and a second end;
   a plurality of components formed of a thermally responsive material and comprising a property based on a geometric shape from among a plurality of geometric shapes, the plurality of components comprising at least a first component located proximate to the first end of the item body and comprising a first geometric shape to impart a first change in a first property, and a second component located proximate to the second end of the item body and comprising a second geometric shape to impart a second change in a second property;
   a heating element proximate to the component of the item body to impart a phase change upon the thermally responsive material;
   an input module comprising one or more processors to receive a user input that initiates the heating element and causes the heating element to impart the phase change upon the thermally responsive material based on a property of the user input; and
   a heating control module that comprises at least one temperature sensor, the heating control module configured to receive a voltage output from the temperature sensor, and the system configured to perform operations that include;
   comparing the voltage output with a reference voltage; and
   configuring the heating element based on a difference between the voltage output and the reference voltage.

2. The system of claim 1, wherein the first component is configured to alter the first property that includes a torsional stiffness property of the item body, and the second component is configured to alter the second property that includes a rocker angle of the item body.

3. The system of claim 1, wherein the first geometric shape of the first component comprises a chevron.

4. The system of claim 1, wherein the second geometric shape of the second component comprises a cruciform.

5. The system of claim 1, wherein the first geometric shape of the first component comprises a crescent.

6. The system of claim 1, wherein the second geometric shape of the second component comprises a parallelogram.

7. The system of claim 1, wherein the first geometric shape of the first component comprises a H-shape.

8. The system of claim 1, wherein the second geometric shape of the second component comprises an I-shape.

9. The system of claim 1, wherein the first geometric shape of the first component comprises a K-shape.

10. The system of claim 1, wherein the second geometric shape of the second component comprises a Y-shape.

11. The system of claim 1, wherein the first geometric shape of the first component comprises a Z-shape.

12. The system of claim 1, wherein the thermally responsive material is treated by one or more treatment processes that comprises:
    applying a treatment temperature above 550° C. to the thermally responsive material for a time period of at least 5 minutes; and
    quenching the thermally responsive material.

13. The system of claim 1, wherein the phase change of the component corresponds with a change to a rocker angle of the item body.

* * * * *